Aug. 11, 1953          W. J. GILBERT, SR          2,648,554
INFLATABLE STANDBY SEAL FOR STATIONARY, REVOLVING, SLIDING, AND
        ROCKING TUBES AND THE LIKE AND SHAFTS AND THE LIKE
Filed July 21, 1949                                2 Sheets-Sheet 1
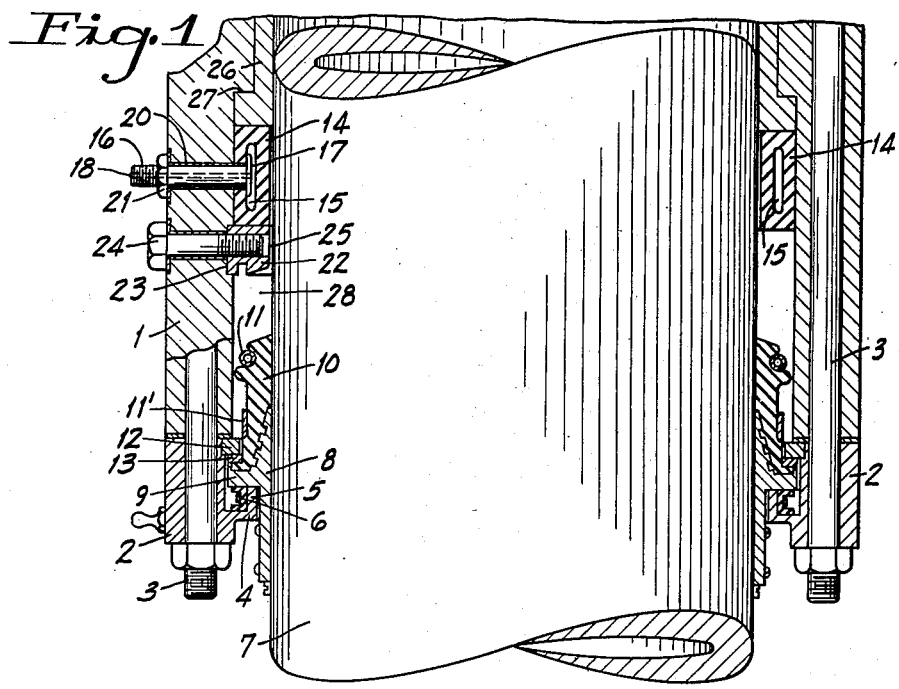
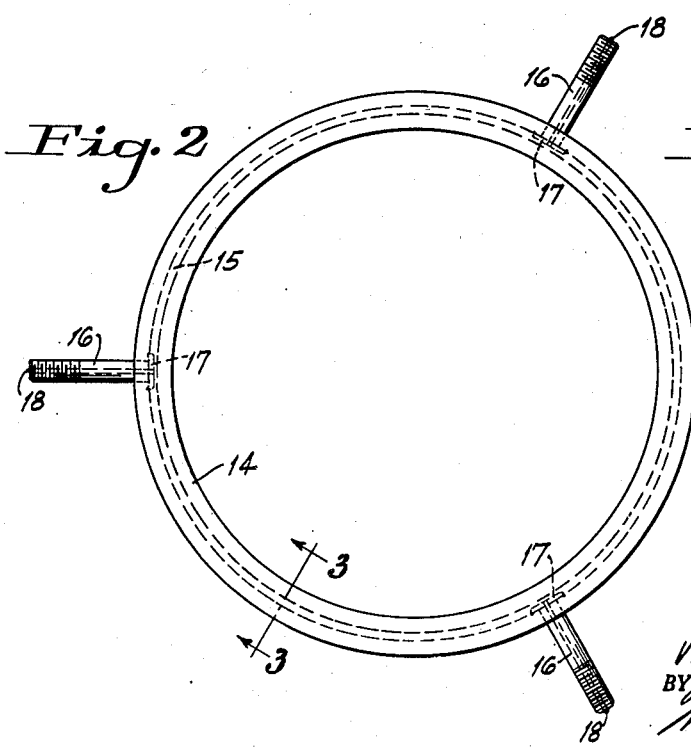
INVENTOR.
WALTER J. GILBERT, SR.
BY
HIS ATTORNEY.

Aug. 11, 1953 W. J. GILBERT, SR 2,648,554
INFLATABLE STANDBY SEAL FOR STATIONARY, REVOLVING, SLIDING, AND
ROCKING TUBES AND THE LIKE AND SHAFTS AND THE LIKE
Filed July 21, 1949 2 Sheets-Sheet 2
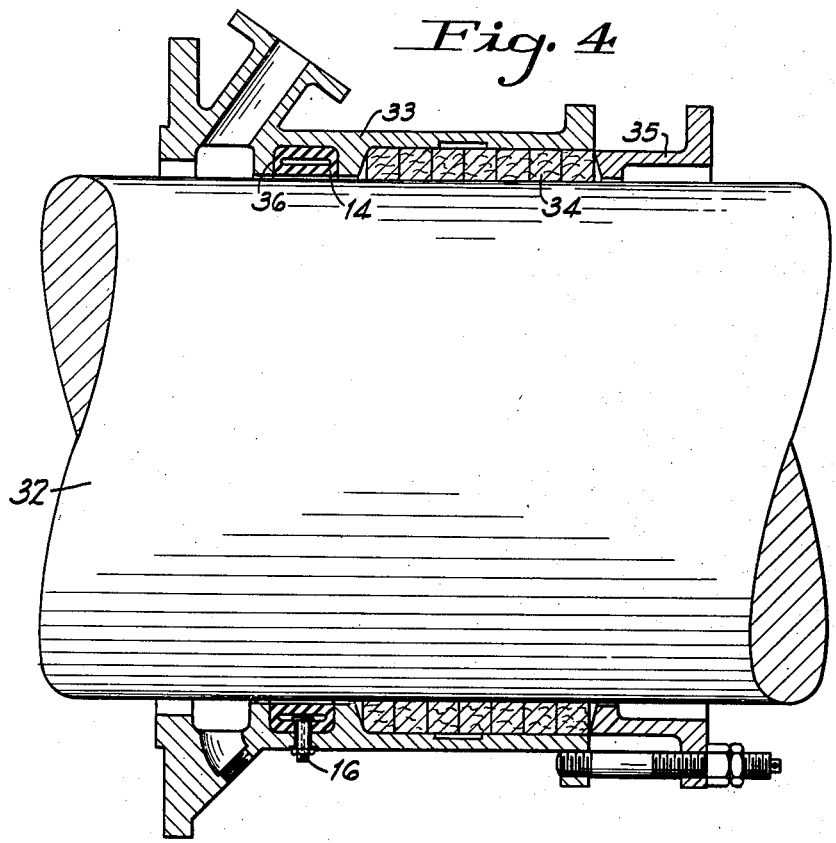
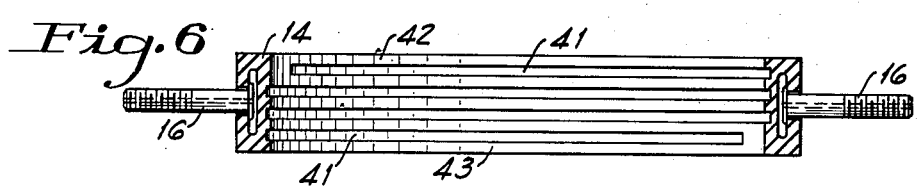
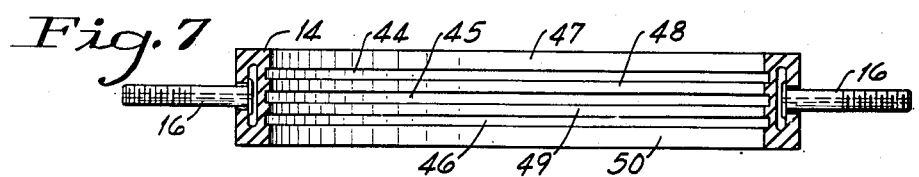
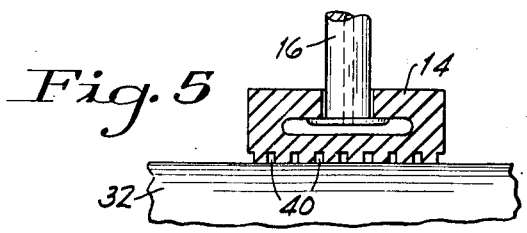
INVENTOR.
WALTER J. GILBERT, SR.
BY
HIS ATTORNEY Patented Aug. 11, 1953

2,648,554

UNITED STATES PATENT OFFICE 2,648,554

INFLATABLE STANDBY SEAL FOR STATIONARY, REVOLVING, SLIDING, AND ROCKING TUBES AND THE LIKE AND SHAFTS AND THE LIKE

Walter J. Gilbert, Sr., Indiana, Pa., assignor to Syntron Company, Homer City, Pa., a corporation of Delaware Application July 21, 1949, Serial No. 106,024

3 Claims. (Cl. 286—26)

1

This invention relates generally to seals for use between members which have relative rotary or combined relative rotary and longitudinal movement and more particularly to inflatable standby seals for temporarily sealing between the members having relative movement to each other to allow replacement or repair of the permanent or principal packing between said members.

In many seal applications it is most important to be able to change or repack the principal seal or packing member while the members being sealed are subjected to fluid pressure. Where the pressure may be relieved or be immediately diverted to repair the principal seal, a standby seal is not needed. However, the periscope of a submerged submarine may be subjected to the pressure of both water and depth charges and it is impossible to replace or repair its ruptured seal without surfacing. The propeller shaft seal of a vessel is likewise impossible to repair if the water pressure prevents removal of the packing gland and the packing. Yet it may be imperative to continue running the submarine or surface vessel to get clear of the danger or to reach port without shipping too great a quantity of water.

The present invention provides an auxiliary or standby seal for temporarily sealing between the members having relative movement and on the pressure side of the principal seal thereof to avoid the aforementioned and other similar difficulties. This auxiliary or standby seal is seated on one member and is not required to touch or otherwise engage the other member until the principal seal must be repaired. When needed the auxiliary seal is expanded to bring it into operation and relieve or partially relieve the pressure on the principal seal. The expansion of the auxiliary seal is preferably done pneumatically, but can be accomplished by fluid under pressure or mechanically. Once the standby seal is expanded, it will hold the fluid pressure and permit the principal seal to be removed and repaired. When applied to a periscope, the auxiliary seal may be expanded to stop any flow of water and the principal seal may be immediately removed and replaced without taking the periscope out of service. However, in the case of a propeller shaft seal, which has materially higher rotation, the auxiliary seal may be designed to block off all or a part of the water pressure around the shaft or the sealing surface that engages the part having relative rotary movement. The auxiliary or standby seal may have a helical groove or a series

2 of labyrinth grooves cut in its sealing surface for the purpose of permitting a small quantity of water to flow therethrough to provide lubricant to the sealing surface and prevent excess wear thereof. The helical groove may extend all the way through the seal from one face to the other or stop short of the faces to function partly as a helical and a labyrinth groove and thereby limit the amount of water necessary for lubrication.

Other objects and advantages appear hereinafter in the following description and claims.

The accompanying drawings show, for the purpose of exemplification, but without limiting the claims thereto, a practical embodiment illustrating the principles of this invention wherein:

Fig. 1 is a view in vertical section illustrating the application of an auxiliary seal to a periscope;

Fig. 2 is a top plan view of the deflated auxiliary seal shown in Fig. 1;

Fig. 3 is a cross-sectional view of the auxiliary seal expanded without being confined;

Fig. 4 is a view in horizontal section illustrating the application of an auxiliary seal to a propeller shaft;

Fig. 5 is a sectional view of an auxiliary seal having a helix or thread groove cut in the sealing surface from one side to the other;

Fig. 6 is a view similar to Fig. 5 showing a helical groove which stops short of the end faces of the seal; and Fig. 7 is a view similar to Fig. 5 showing a series of unconnected parallel labyrinth grooves in the sealing surface of the auxiliary sealing member.

Referring to Fig. 1 of the drawing, 1 represents a vertically disposed stationary tube which is rigidly secured in sealed relation with the hull of the submarine. The lower end of the tube 1 is arranged to receive a ring-shaped bottom plate member 2 which is bolted by means of the studs 3 to the vertically disposed stationary or outer periscope tube 1. The ring 2 is provided with an inturned annular flange 4 having an upstanding annular lip 5 that forms a trough for the reception of the band retained stationary annular sealing member 6, an elastomer preferably made of resilient material such as a rubber or synthetic rubber.

The inner concentric tube 7 is the periscope tube and it is both rotatable and movable axially of the outer stationary tube 1. The periscope tube 7 has the annular sleeve 8 slidably mounted thereon with just sufficient clearance to permit the periscope to be readily moved therein. The annular sleeve 8 has an outwardly projecting flange 9, the under side of which rests on the upper face of the upturned annular flange 5 and is sealed by the stationary annular sealing member 6. The sleeve 8 is arranged to carry the annular flexible sealing sleeve 10, the bore of which is smaller in diameter than that of the periscope tube 7 and is slipped thereon, being anchored on the sleeve as indicated in the drawing and being retained adjacent its outer end by the annular spring member 11 and a strap band 11'. The upper end of the stationary ring 2 that is secured to the under side of the tube 1 is provided with a shoulder to receive the annular retainer ring 12. An annular wear ring 13 is mounted on the foot of the rubber sealing member 10 and is arranged to engage the under side of the annular retainer ring 12 as shown. This structure does not form a part of the present invention other than to illustrate one manner in which a permanent or principal seal is provided between two coaxial concentric members such as the stationary tube 1 and the periscope tube 7.

The seal comprising this invention is illustrated at 14, which is provided with an annular hollow chamber 15 that is capable of being supplied with the fluid under pressure for expanding the same as illustrated in Fig. 3 as a free body. The annular chamber 15 of the inflatable temporary sealing member 14 is provided with a plurality of valve members which are vulcanized therein at spaced intervals as illustrated in Fig. 2. The valved stem members 16 are provided with a head 17 that is disposed within the chamber 15 and are provided with an ordinary air valve 18 similar to those of a pneumatic inner tube. This annular inflatable temporary sealing member is sufficiently flexible so that it may be deformed to permit the insertion of the valve stems 16 through prepositioned holes 20 in the outer stationary tube 1 of the periscope as shown in Fig. 1. The outer surface of the valve stems 16 are threaded as indicated for the purpose of receiving the nuts 21 for holding the inflatable ring in position and to seal the holes 20. In order to support the low pressure side of the ring within the tube 1 an annular partable ring 22 is seated on a shoulder of the internal groove 23 of the tube 1 and is held in place by the bolts 24 that are also sealed. This partable or sectioned ring 22 may be made in two or more pieces as desired. However, it is preferable to construct the same in three sections so that each section may be independently placed and secured in the groove 23 by its bolt 24 mounted in the center of the ring.

It will be noted that the bore of the deflated temporary seal 14 and the bore of the partable ring 22 provide clearance with the inner periscope tube 7 as illustrated at 25. It is also preferable to place an outer bearing member such as indicated by the continuous annular ring 26 above the inflatable standby seal 14, which bearing member is seated on the shoulder 27 in the tube 1 and permits the periscope tube to turn therein, but is not sufficiently tight to prevent the leakage or passage of water or other fluid under pressure therepast, which fluid may readily flow past the standby seal and its sectioned supporting ring 22 to the chamber 28 where it is effective as a fluid pressure on the permanent or principal seal member 10.

The temporary or inflatable standby seal 14 is not intended for constant use. Therefore, it is preferable that it remain deflated in position and not touch the movable member or tube 7. However, the valve stems 16, which hold the seal in place, prevent any leakage of fluid through the holes 20 owing to the fact that the ring is clamped in place by the nuts 21 on the valve stem 16.

As shown in Fig. 3, the inflatable standby seal 14 is expanded as a free body. The upper and lower surfaces thereof dish inwardly as illustrated at 30 and the sides of the ring expand outwardly as illustrated at 31. However, when the seal 14 is in place and inflated, it is then able to expand against the tube 1 and exerts considerable pressure against the adjacent perimetral area of the periscope tube 7 with the ends of the seal forming tight sealing engagement with the adjacent members 22 and 26. By regulating the inflation pressure one may regulate the quantity of water leakage past this seal or stop the flow of water entirely.

If the submarine is in service and has been subjected to depth charges or has had to dive to a considerable depth where the pressure is destructive to the principal seal 10, causing a considerable leakage past the periscope tube 7, a fluid such as air under pressure may be inserted in a selected one of the valve stems 16 to expand the inflatable standby seal and cause it to seal against the periscope tube 7 thereby permitting the ring 2 to be lowered and the principal seal 10 to be replaced without taking the periscope out of service. In the present practice, when the principal seal 10 gives out, it is necessary to surface or to seal off the tube in such a way that the periscope cannot be used which could prove to be disastrous. Thus, the temporary flexible inflatable standby seal permits the ship to continue in operation and to go about its business under water without harm or without flooding or shipping excessive amounts of water in the submarine. It has also been determined that the inflatable standby seal is capable of withstanding materially greater shock pressures than that of the permanent seal 10. However, it may not be desirable to employ this type of member as a principal seal. Thus, the temporary seal may be applied in anticipation of the pressure that would accompany a depth charge and thus save the permanent seal from damage.

The structure illustrated in Fig. 4 is a horizontal section of a propeller shaft for a seagoing vessel wherein the propeller shaft is illustrated at 32 and extends through the packing housing 33 which contains the permanent packing member 34 that may be taken up by the gland member 35 in the usual manner. The housing 33 is provided with an annular groove 36 for the purpose of receiving the inflatable standby seal 14 in a manner very similar to that illustrated in Fig. 1. Here the standby seal is secured in the groove 36 which is designed to substantially fit the inflatable packing member and when inflated provides clearance with the perimetral surface of the propeller shaft 32. When the principal seal 34 gives out or otherwise is destroyed, all that is necessary is to inflate the standby seal which expands against the perimetral surface of the propeller shaft and permits the gland 35 to be retracted and the principal packing to be replaced. Thus, the packing around the propeller shaft of large ships may be readily repaired in a very short time at sea regardless of the pressure conditions of the fluid and without excessive leakage as the inflatable standby seal securely prevents the flow of water therepast and permits the permanent seal to be opened and repaired; otherwise the ship may have to keep its bilge pumps running at full capacity until the ship makes shore and is drydocked to remove the water pressure from around the propeller shaft.

The structure as shown in Figs. 5, 6 and 7 illustrates different types of sealing surfaces that may be employed, either with a periscope or a propeller shaft or other similar installations wherein it is desirable to allow a small amount of water to pass this seal for the purpose of lubricating the elastomer material and permit free movement of the rotary member therein. As shown in Fig. 5 the grooves 40 on the sealing surface of the inflatable standby elastomer seal 14 are thread shaped and extend from one face of the seal to the other, thereby permitting a limited amount of fluid to continually pass through the seal member when it is in service. It is desirable to permit a certain amount of water to travel past a standby propeller seal so that the elastomer material is properly lubricated and the ship continues in full service. The threaded grooves 40 permit only a limited amount of water to pass the standby seal, which water may be readily taken care of by the bilge pumps and is not of sufficient pressure to prevent the repacking of the principal seal 34. Thus, by controlling the flow of a desired amount of water past the standby seal, the inflatable elastomer member 14 may be properly lubricated and still function to permit the principal seal to be repaired or replaced.

In the structure shown in Fig. 6, the threaded grooves 41 stop short of the end faces of the elastomer member 14 and thus the limited amount of water that may pass between the propeller shaft or other rotary member and the elastomer member 14 must first pass the solid section as indicated at 42 in order to reach the threaded grooves 41 from whence it travels in a helical path to the opposite side of the seal and then it must pass the land section 43 in order to reach the inside of the hull of the ship.

In the structure shown in Fig. 7, a series of unconnected parallel labyrinth grooves 44, 45 and 46 are provided in the sealing surface of the inflatable standby seal 14 for the purpose of requiring any liquid leaking thereby to pass each of the land sections 47, 48, 49 and 50 before reaching the interior of the hull of a ship.

Thus, by pressure and restriction, one can properly control the leakage of water past the standby seal for the purpose of lubricating the same by the use of the labyrinth arrangement as illustrated in Figs. 5 to 7, inclusive. It being desirable to properly control the amount of fluid permitted to pass the standby seal and also limit the amount of water to be handled and the pressure thereof so that the permanent seal may be repaired or replaced. The class of service to which these standby seals are applied determines the size and character of a threaded or labyrinth groove employed and when subjected to high pressure, such as on the propeller shaft of a submarine, it is preferable to have a higher pressure seal than that employed on surface vessels.

I claim:

1. A standby seal comprising a stationary tubular housing having in its bore spaced radial shoulders forming an annular recess of rectangular cross section, an inner axial member of uniform diameter mounted for movement in said bore and closing said recess by providing a small clearance with the bore adjacent each shoulder, an annular elastomer of rectangular cross section with substantially square corners filling said recess and seating in the bottom of said recess and against both of said shoulders with the square corners adjacent said clearances, means defining a fluid passage in said elastomer, the front and back walls of the elastomer being substantially equal in thickness, valve stem means connecting said fluid passage exteriorly of said tubular housing to hold said annular elastomer in spaced relation with said inner axial member when depressurized and to admit fluid under pressure to said fluid passage to expand the wall of said elastomer to seal said small clearances with said square corners and against said inner axial member.

2. The structure of claim 1 characterized in that one of said radial shoulders is formed by a ring seated in an annular groove in the bore of said tubular housing.

3. The structure of claim 1 characterized in that said tubular housing is made in sections split longitudinally of its axis to permit it to be assembled around said inner axial member.

WALTER J. GILBERT, Sr.

References Cited in the file of this patent

UNITED STATES PATENTS

| Number | Name | Date |
|---|---|---|
| 632,442 | Byle et al. | Sept. 5, 1899 |
| 2,038,140 | Stone | Apr. 21, 1936 |
| 2,193,887 | Seeley | Mar. 19, 1940 |
| 2,212,588 | Csanyi | Aug. 27, 1940 |
| 2,329,028 | Austin | Sept. 7, 1943 |
| 2,399,544 | Danner | Apr. 30, 1946 |
| 2,487,177 | Pollock | Nov. 8, 1949 |

FOREIGN PATENTS

| Number | Country | Date |
|---|---|---|
| 3,503 | Great Britain | of 1910 |
| 799,867 | France | Apr. 20, 1936 |